(12) United States Patent
Bennet et al.

(10) Patent No.: US 12,498,391 B2
(45) Date of Patent: Dec. 16, 2025

(54) UNDERWATER ACOUSTIC RECEIVER APPARATUS AND METHOD OF MONITORING A TARGET PORTION OF A WATER COLUMN

(71) Applicant: SONARDYNE INTERNATIONAL LIMITED, Yateley (GB)

(72) Inventors: Philip Hugh Bennet, Gillingham (GB); Robert James Crook, Castle Cary (GB); Darryl Newborough, Hartley Wintney (GB); Jonathan James Davies, Dorchester (GB)

(73) Assignee: SONARDYNE INTERNATIONAL LIMITED, Hampshire (GB)

( * ) Notice: Subject to any disclaimer, the term of this patent is extended or adjusted under 35 U.S.C. 154(b) by 220 days.

(21) Appl. No.: 17/801,692

(22) PCT Filed: Feb. 24, 2021

(86) PCT No.: PCT/GB2021/050447
§ 371 (c)(1),
(2) Date: Aug. 23, 2022

(87) PCT Pub. No.: WO2021/170992
PCT Pub. Date: Sep. 2, 2021

(65) Prior Publication Data
US 2023/0132566 A1  May 4, 2023

(51) Int. Cl.
*G01P 5/24* (2006.01)
*G10K 11/20* (2006.01)
*G10K 11/28* (2006.01)

(52) U.S. Cl.
CPC ............ *G01P 5/241* (2013.01); *G10K 11/205* (2013.01); *G10K 11/28* (2013.01)

(58) Field of Classification Search
CPC ........ G01P 5/241; G01K 11/205; G01K 11/28
See application file for complete search history.

(56) References Cited

U.S. PATENT DOCUMENTS

| | | | |
|---|---|---|---|
| 5,208,785 A | 5/1993 | Brumley et al. | |
| 7,420,875 B1 | 9/2008 | Hendricks | |
| 8,111,585 B1 | 2/2012 | Graber | |
| 9,268,020 B2* | 2/2016 | Coleman | G01S 7/521 |
| 2008/0080313 A1 | 4/2008 | Brumly et al. | |
| 2011/0149689 A1* | 6/2011 | Lohrmann | G01S 15/88 367/89 |
| 2018/0087949 A1 | 3/2018 | Schutzbach | |

OTHER PUBLICATIONS

International Search Report for International Application No. PCT/GB2021/050447 dated Jun. 18, 2021.

\* cited by examiner

*Primary Examiner* — Kristina M Deherrera
*Assistant Examiner* — Jean F Morello
(74) *Attorney, Agent, or Firm* — Harness, Dickey, & Pierce, P.L.C.

(57) ABSTRACT

An underwater acoustic receiver apparatus (100) comprises an acoustic reflector (102, 104, 106, 108) and an acoustic device (110, 114, 116, 118) aimed at the acoustic reflector (102, 104, 106, 108). The acoustic reflector (102, 104, 106, 108) is disposed at a predetermined distance and orientation relative to the acoustic device (110, 114, 116, 118).

19 Claims, 4 Drawing Sheets

UNDERWATER ACOUSTIC RECEIVER APPARATUS AND METHOD OF MONITORING A TARGET PORTION OF A WATER COLUMN

CROSS-REFERENCE TO RELATED APPLICATIONS

This application is the U.S. National Phase under 35 U.S.C. § 371 of International Application No. PCT/GB2021/050447, which has an international filing date of Feb. 24, 2021, and which claims priority to United Kingdom Patent Application No. 2002593.8, filed Feb. 24, 2020, the entire contents of each of which are incorporated herein by reference.

FIELD

The present invention relates to an underwater acoustic receiver apparatus of the type that, for example, comprises an acoustic focal point device to receive an acoustic beam pattern from a water column. The present invention also relates to a method of monitoring a target portion of a water column, the method being of the type that, for example, comprises receiving an acoustic beam pattern from the target portion of the water column.

BACKGROUND

A so-called current profiler finds numerous applications in the field of underwater acoustics. The current profiler, for example of the kind described in U.S. Pat. No. 5,208,785, measures backscatter intensities and water velocity over various ranges of distance relative to the measurement instrument. Different current profilers, more accurately referred to as Acoustic Doppler Current Profilers (ADCPs), are designed to measure water currents over different ranges. Furthermore, ADCPs can employ different frequencies depending upon the range of profile sought. This can lead to performance and cost penalties when compared to instruments that are comparable in some technical respects.

For example, existing low-frequency, long range, ADCPs typically operating at frequencies between about 45 kHz and 100 kHz employ large transducers in order to provide beam widths comparable to those of higher frequency ADCPs, which results in an increase in cost of manufacturing the instrument. The increased transducer size can also hinder performance owing to, for example, the presence of a large surface in an underwater environment that can be prone to collisions with debris. Existing ADCPs are "fragile" and can be damaged during deployment, for example using a winch. Such damage can be to seals, leading to water ingress. In the absence of physical damage during deployment, water ingress into a transducer head is nevertheless also a risk. Indeed, so-called pressure cycling can occur when the instrument is repeatedly removed from the water and redeployed, which can lead to seal failure and the consequential water ingress into the transducer head mentioned above.

US 2008/0080313 describes a low-frequency ADCP comprising a single phased-array transducer head that employs acoustic beam steering. However, such an instrument has increased complexity over traditional ADCP designs, which is accompanied by a corresponding manufacturing complexity owing to the need for additional multiple manufacturing stages as compared with ADCPs that do not employ beam steering. Such an instrument is therefore more costly to manufacture than simpler designs of ADCPs. Furthermore, the increase in complexity invites an increased risk of instrument failure. The design of this ADCP is also susceptible to mechanical damage, which can lead to water ingress and consequential damage to the instrument's electronic circuits.

Another design is embodied in the Signature55™ current profiler by Nortek AS, which comprises a monolithic transducer head arrangement of, for example, three sometimes upwardly facing angularly spaced transducer heads. However, this design is also susceptible to mechanical damage due to the large size of the transducers, which increases the likelihood of the transducer being struck, for example during deployment. Such harm can lead to subsequent ingress of water and hence damage that is inevitably fatal to the instrument.

SUMMARY

According to a first aspect of the present invention, there is provided an underwater acoustic receiver apparatus comprising: an acoustic reflector; and an acoustic device aimed at the acoustic reflector; wherein the acoustic reflector is disposed at a predetermined distance and orientation relative to the acoustic device.

The apparatus may further comprise: a spacer; wherein the acoustic device may be disposed at a first anchoring point of the spacer; and the acoustic reflector may be disposed at a second anchoring point of the spacer; the second anchoring point may be distal from the first anchoring point.

The spacer may have a longitudinal axis; the acoustic reflector may be oriented away from the longitudinal axis.

The apparatus may further comprise a stand; the stand may constitute the spacer.

The acoustic reflector may be a parabolic reflector.

The parabolic reflector may comprise a primary axis of symmetry; wherein the axis of symmetry may be inclined at an angle relative to the longitudinal axis and away from the longitudinal axis.

The parabolic reflector may define a section of a paraboloid; the acoustic device may be aimed at the section of the paraboloid. A secondary axis of symmetry of the section of the paraboloid may be off-axis relative to a primary axis of symmetry of the acoustic reflector.

The primary axis of symmetry of the acoustic reflector may be a central axis of symmetry.

The apparatus may further comprise: a line of sight from the acoustic device to an internal surface of the acoustic reflector; wherein the line of sight may be unimpeded.

The longitudinal axis may be a central longitudinal axis; and the acoustic reflector may be laterally offset relative to the acoustic device and the central longitudinal axis.

The acoustic reflector may be configured to extend laterally beyond the acoustic device.

The apparatus may further comprise: a deployed orientation; and a first end and a second end relative to the deployed orientation; wherein the acoustic device may be disposed towards the first end; and the acoustic device may be oriented downwardly towards the second end.

The apparatus may further comprise: another acoustic device.

The another acoustic device may be aimed at the acoustic reflector; the another acoustic device may be disposed at another predetermined distance from the acoustic reflector.

The apparatus may further comprising: another acoustic reflector; wherein the another acoustic device may be aimed at the another acoustic reflector; the another acoustic device may be disposed at another predetermined distance from the another acoustic reflector.

The acoustic device may be an acoustic projector.

The acoustic device may be an acoustic receiver.

The acoustic projector may be configured to generate an acoustic beam pattern having a primary lobe and the acoustic reflector may be located relative to the acoustic projector so as to intersect the primary lobe.

The acoustic reflector may define an f-number associated therewith; the f-number may be set so as to minimise reflection of side lobes of the acoustic beam pattern.

The acoustic projector may be configured to emit an acoustic beam pattern; the acoustic pattern may comprise a beam portion of interest that is emitted towards the acoustic reflector. The acoustic reflector may be configured to reflect the beam portion of interest, when in use, into a target portion of a water column, thereby ensonifying the target portion of the water column. The apparatus may comprise a structural configuration; the structural configuration may be arranged to prevent a shadow being cast, when in use, on the acoustic reflector in respect of the emitted beam portion of interest and on the target portion of the water column to be ensonified by the reflection of the portion of interest.

The acoustic device may be an acoustic transducer. The acoustic projector may be an acoustic transducer.

The acoustic transducer may be a single crystal ceramic transducer.

According to a second aspect of the present invention, there is provided an Acoustic Doppler Current Profiler apparatus comprising the apparatus as set forth above in relation to the first aspect of the invention.

According to a third aspect of the present invention, there is provided an Acoustic Doppler Current Profiler apparatus comprising: a central stand; a first acoustic projector operably coupled at a first end of the central stand and aimed at a first acoustic reflector operably coupled to a second end of the central stand, the first acoustic projector being spaced from the first acoustic reflector by a first predetermined distance; a second acoustic projector operably coupled at the first end of the central stand and aimed at a second acoustic reflector operably coupled to the second end of the central stand, the second acoustic projector being spaced from the second acoustic reflector by a second predetermined distance; a third acoustic projector operably coupled at the first end of the central stand and aimed at a third acoustic reflector operably coupled to the second end of the central stand, the third acoustic projector being spaced from the third acoustic reflector by a third predetermined distance; and a fourth acoustic projector operably coupled at the first end of the central stand and aimed at a fourth acoustic reflector operably coupled to the second end of the central stand, the fourth acoustic projector being spaced from the fourth acoustic reflector by a fourth predetermined distance; wherein the first, second, third and fourth acoustic projectors are disposed about the central stand at the first end thereof; the first, second, third and fourth acoustic reflectors are disposed about the central stand at the second end thereof; and each of the first, second, third and fourth acoustic reflectors is orientation away from each other and away from the central stand.

According to a fourth aspect of the invention, there is provided a method of monitoring a target portion of a water column, the method comprising: an acoustic device receiving an acoustic beam from an acoustic reflector from a predetermined distance to the acoustic device; and the acoustic reflector reflecting the acoustic beam from the target portion of the water column, the acoustic reflector being oriented relative to the acoustic projector.

It is thus possible to provide an apparatus and method that support a simpler design to existing current profilers and also permits the use of a commonplace, for example single crystal, ceramic transducer, which is considerably smaller, for example by about a factor of ten, than transducers used in other designs. Such transducers are manufactured using well-established manufacturing techniques and benefit from the economies of mass production. The transducers are also physically more robust than transducers used in other designs. The presence of the acoustic reflectors serves as a protective barrier of sorts for the acoustic projectors. In this respect, the acoustic projectors are shielded by the reflectors from mechanical traumas from beneath the acoustic projectors, the reflectors being struck in preference to the acoustic projectors. Indeed, irrespective of the orientation of the apparatus, the reflectors provide a degree of protection from traumas. Furthermore, when the acoustic projectors are downwardly facing, the downward facing inclination of the acoustic projectors and their associated seating within the structure of the housing also serves to protect the acoustic projectors from mechanical traumas from above the apparatus. The arrangement also provides the same or a comparable beam width to exiting apparatus whilst employing a smaller transducer size. Damage to the reflector has negligible effect on the reflector surface accuracy and shape and hence the acoustic performance of the reflector, which is in contrast to the known solutions, where damage to the transducer head results, at best, in degraded acoustic performance and, in the worst case, to ingress of water and ensuing fatal damage to the head and associated electronics. Therefore, the apparatus benefits from a superior lifetime as compared with existing current profilers. Furthermore, in the event of failure, the cost of replacing an acoustic projector is less than for other known designs owing to the use by the apparatus of low-cost commonplace transducers.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
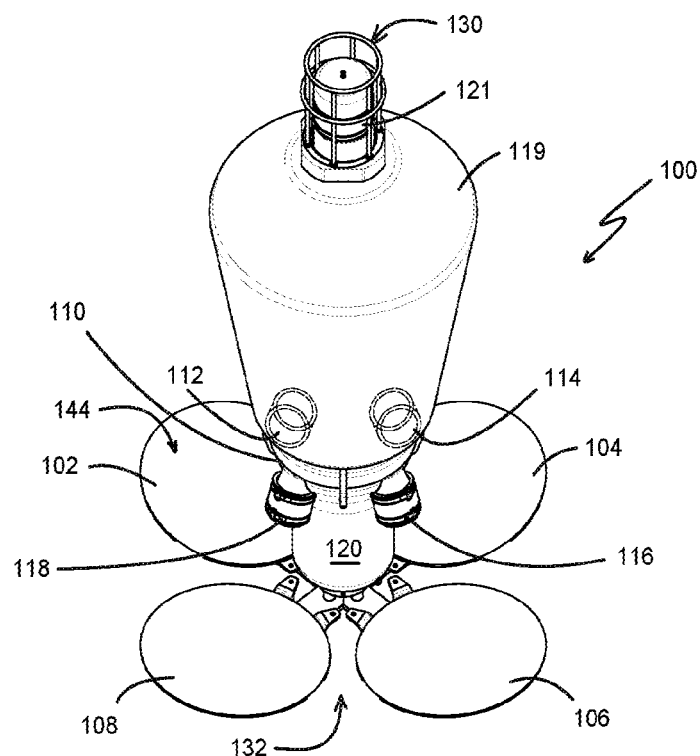
FIG. 1 is a schematic perspective view of an underwater ensonification apparatus from a first perspective and constituting an embodiment of the invention.
Figure 2:
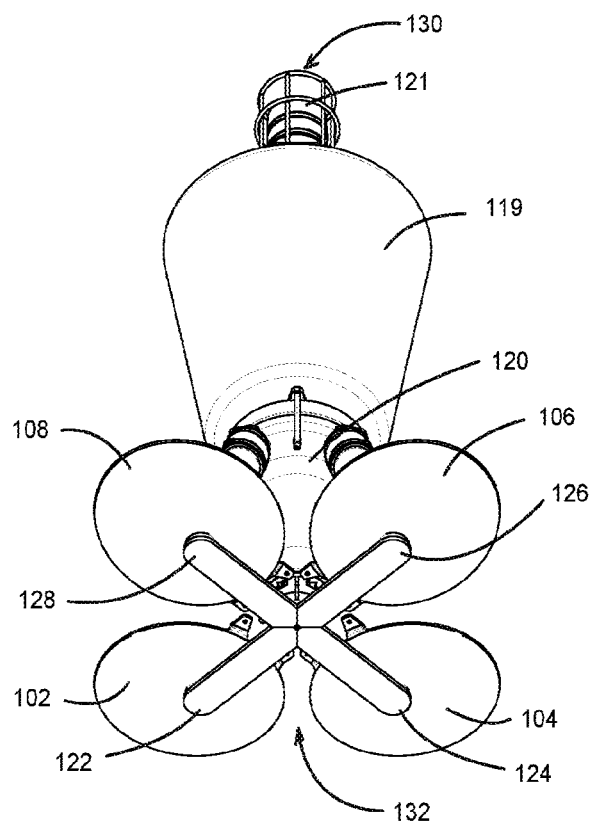
FIG. 2 is a schematic perspective view of the underwater ensonification apparatus of FIG. 1 from a second perspective.
Figure 3:
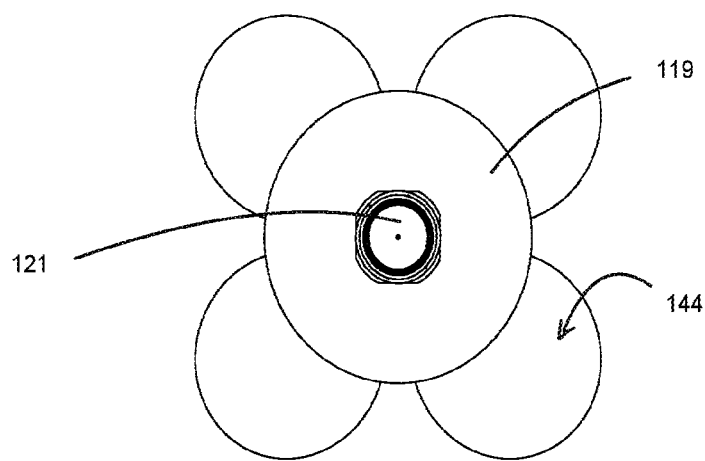
FIG. 3 is a schematic plan view of the apparatus of FIG. 1.
Figure 4:
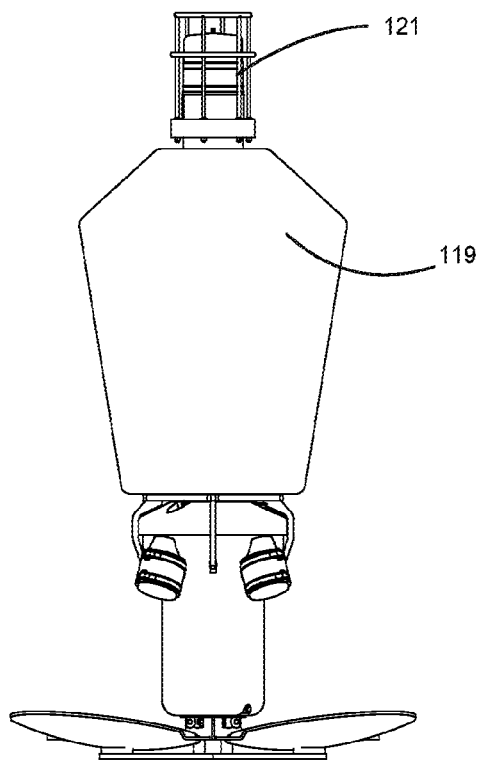
FIG. 4 is a schematic side elevation of the apparatus of FIG. 1.

Throughout the following description, identical reference numerals will be used to identify like parts.

Referring to FIGS. 1 to 4, an underwater ensonification apparatus 100, for example an Acoustic Doppler Current Profiler (ADCP) apparatus, comprises a plurality of acoustic reflectors, for example a first so-called acoustic mirror 102, a second acoustic mirror 104, a third acoustic mirror 106 and a fourth acoustic mirror 108. The acoustic mirrors 102, 104, 106, 108 are each, in this example, between about 3 mm and about 10 mm thick, such as about 5 mm thick, and are sufficiently thick to provide mechanical robustness, but thin enough to avoid unwanted resonances and unnecessary additional weight. In this example, the first, second, third and fourth acoustic mirrors 102, 104, 106, 108 are formed of a metal alloy, such as using a casting process. One example alloy is a Nickel Aluminium Bronze alloy CC333G, which conforms to the standard BS EN 1982:2008 relating to control copper and copper alloys. Alternatively, the acoustic mirrors can be formed from stamped mild steel, although other suitable materials can be employed.

The apparatus 100 also comprises a plurality of acoustic projectors, for example a first acoustic transducer 112, a second acoustic transducer 114, a third acoustic transducer 116 and a fourth acoustic transducer 118. The first acoustic transducer 112 is aimed at the first acoustic mirror 102, the second acoustic transducer 114 is aimed at the second acoustic mirror 104, the third acoustic transducer 116 is aimed at the third acoustic mirror 106, and the fourth acoustic transducer 118 is aimed at the fourth acoustic mirror 108. Further details of the orientation of the acoustic transducers 112, 114, 116, 118 respectively relative to the acoustic mirrors 102, 104, 106, 108 will be described later herein. In this example, each of the first, second, third and fourth acoustic transducers 112, 114, 116, 118 is a single crystal acoustic transducer, for example a Lead Zirconium Titanate (PZT) ceramic transducer available from Sparkler Ceramics Pvt. Ltd., India, or CeramTec UK Limited. However, the skilled person will appreciate that any other suitable transducer type can be employed.

The acoustic reflectors 102, 104, 106, 108 are each respectively disposed at a predetermined distance from the acoustic transducers 112, 114, 116, 118 by a spacer 120 having a central longitudinal axis. An annular mounting bracket 110 having a central axial aperture is disposed at a first end of the spacer 120, the mounting bracket 110 comprising in this example, a first aperture in which the first acoustic transducer 112 is mounted, a second aperture in which the second acoustic transducer 114 is mounted, a third aperture in which the third acoustic transducer 116 is mounted, and a fourth aperture in which the fourth acoustic transducer 118 is mounted. The annular mounting bracket 110 also serves as a baffle. A float 119 is also coupled at a first end thereof to the first end of the spacer 120 and an acoustic modem 121 is coupled to a second end of the float 119. However, the skilled person should appreciate that the float 119 and the acoustic modem 121 are optional, and can be contingent upon the manner of deployment of the apparatus 100, for example they are not necessarily required when the apparatus 100 is deployed on the underside of a vessel or a buoy.

In this example, the spacer 120 is a cylindrical housing. The cylindrical housing is a pressure housing that contains, inter alia, a power source, for example electrical cells and electronic circuitry to drive and control the first, second, third and fourth acoustic transducers 112, 114, 116, 118, as well as record and optionally process measurements made using the first, second, third and fourth acoustic transducers 112, 114, 116, 118.

The mounting bracket 110 retains the first, second, third and fourth acoustic transducers 112, 114, 116, 118 at respective first anchoring points. In this example, the first, second, third and fourth acoustic transducers 112, 114, 116, 118 are circumferentially spaced about the spacer 120 and electrically coupled to the electronic circuitry contained within the spacer 120.

A first flat spacing bar 122, a second flat spacing bar 124, a third flat spacing bar 126, and a fourth flat spacing bar 128 are respectively attached at one end thereof to a second end of the spacer 120 and extend radially outwards with an equal angular spacing therebetween. The first acoustic mirror 102 is attached to a second end of the first flat spacing bar 122, the second acoustic mirror 104 is attached to a second end of the second flat spacing bar 124, the third acoustic mirror 106 is attached to a second end of the third flat spacing bar 126, and the fourth acoustic mirror 108 is attached to a second end of the fourth flat spacing bar 128. The first, second, third and fourth acoustic mirrors 102, 104, 106, 108 are therefore respectively disposed at a second anchoring point distal from the first anchoring point. The apparatus 100 has an in-use orientation as shown in FIGS. 1 to 4, the apparatus 100 having an upper end 130 and a lower end 132 relative to the in-use orientation, i.e. the first, second, third and fourth acoustic mirrors 102, 104, 106, 108 are disposed, in this example, closest to the seabed. However, as intimated above, placing the apparatus 100 on the seabed is just one manner of deployment of the apparatus 100. The first, second, third, and fourth acoustic transducers 112, 114, 116, 118 are disposed towards the upper end 130 and the first, second, third, and fourth acoustic mirrors 102, 104, 106, 108 are disposed towards the lower end 132.

In this example, the first, second, third and fourth acoustic mirrors 102, 104, 106, 108 are each oriented away from the longitudinal axis of the spacer 120. Indeed, in other embodiments, the acoustic reflectors are oriented outwardly from and away from the structure of the apparatus 100. Furthermore, the first acoustic mirror 102 is laterally offset relative to the first acoustic transducer 112 and the central longitudinal axis of the spacer 120, the second acoustic mirror 104 is laterally offset relative to the second acoustic transducer 114 and the central longitudinal axis of the spacer 120, the third acoustic mirror 106 is laterally offset relative to the third acoustic transducer 116 and the central longitudinal axis of the spacer 120, and the fourth acoustic mirror 108 is laterally offset relative to the fourth acoustic transducer 118 and the central longitudinal axis of the spacer 120. In this regard, and in this example, the first acoustic mirror 102 extends laterally beyond a first outermost part of the periphery of the first acoustic transducer 112, the second acoustic mirror 104 extends laterally beyond a second outermost part of the periphery of the second acoustic transducer 114, the third acoustic mirror 106 extends laterally beyond a third outermost part of the periphery of the third acoustic transducer 116, and the fourth acoustic mirror 108 extends laterally beyond a fourth outermost part of the periphery of the fourth acoustic transducer 118.

In this example, the spacer 120 comprises the first, second, third and fourth flat spacing bars 122, 124, 126, 128 and constitutes a stand.

Each of the first, second, third, and fourth acoustic mirrors 102, 104, 106, 108 is a parabolic reflector. For the sake of clarity and conciseness of description, only the first acoustic mirror 102 and the first acoustic transducer 112 will now be described in further detail, although the skilled person should appreciate that the description of the first acoustic mirror 102 applies also to each of the second, third and fourth acoustic mirrors 104, 106, 108 and the description of the first acoustic transducer 112 applies also to each of the second, third and fourth acoustic transducers 114, 116, 118.

Figure 5:
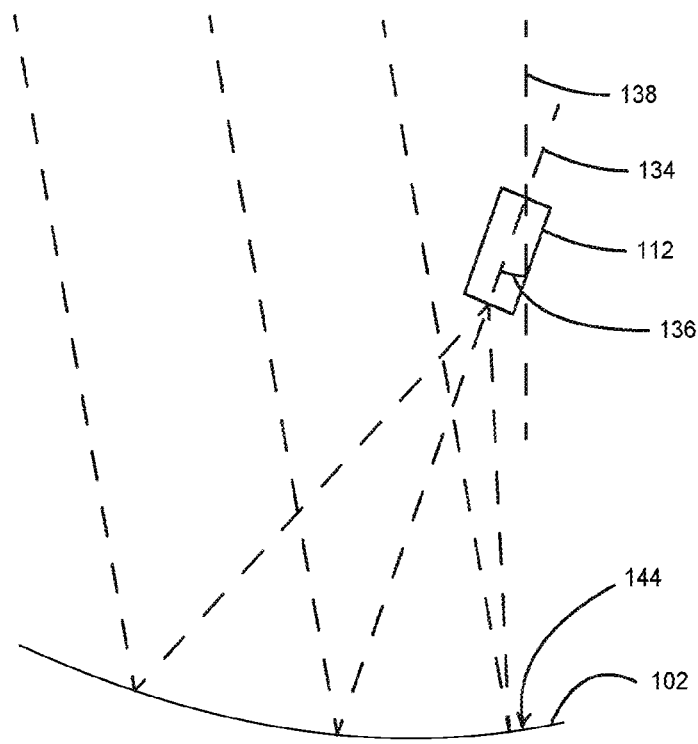
FIG. 5 is a schematic diagram of an acoustic reflector of the apparatus of FIG. 1.

Referring to FIG. 5, the first acoustic mirror 102 comprises a central axis of symmetry 134 that is inclined at an angle 136 relative to a notional longitudinal axis 138 parallel with the longitudinal axis of the spacer 120, the orientation being away from the notional longitudinal axis 138. In this example, the surface curvature of the first acoustic mirror 102 is defined as being a portion of a much larger parent paraboloid shape, and is used for reflection of acoustic signals. In this regard, the first acoustic mirror 102 is a 0.4 m diameter section of the parent paraboloid. The 0.4 m section of the parent paraboloid has a child central axis and the parent paraboloid has a parent central axis, and the child central axis of the 0.4 m region is located 0.2 m off-axis (in a straight line) with respect to the parent central axis, i.e. the distance between the parent central axis and the child central axis is 0.2 m. As mentioned above, the first acoustic transducer 112 is aimed at the first acoustic mirror 102.

In this example, a segment slant focal length extends from a phase centre of the first acoustic transducer 112 to an acoustic centre point of the 0.4 m child section (the first acoustic mirror 102) of the parent paraboloid. The parent paraboloid has a focal length is 0.3 m, resulting (in conjunction with the above design parameters) in the segment slant focal length being about 0.327 m. The ratio of the segment slant focal length to the diameter of the first acoustic mirror 102 yields an effective f-number for the acoustic mirror 102 of 0.8175. The above dimensions are determined in order to minimise reflection of side lobes of an incident acoustic beam pattern, when in use.

In this example, a line of sight exists from the first acoustic transducer 112 to the first acoustic mirror 102, the line of sight being a clear, unimpeded, line of sight to an internal surface 144 of the first acoustic mirror 102. Indeed, a structural configuration of the apparatus 100, for example comprising the spacer 120, the mounting bracket 110 and/or the first, second, third and fourth flat spacing bars 122, 124, 126, 128, is arranged to prevent one or more shadows being cast, when in use, on the first, second, third and fourth acoustic mirrors 102, 104, 106, 108.

Figure 6:
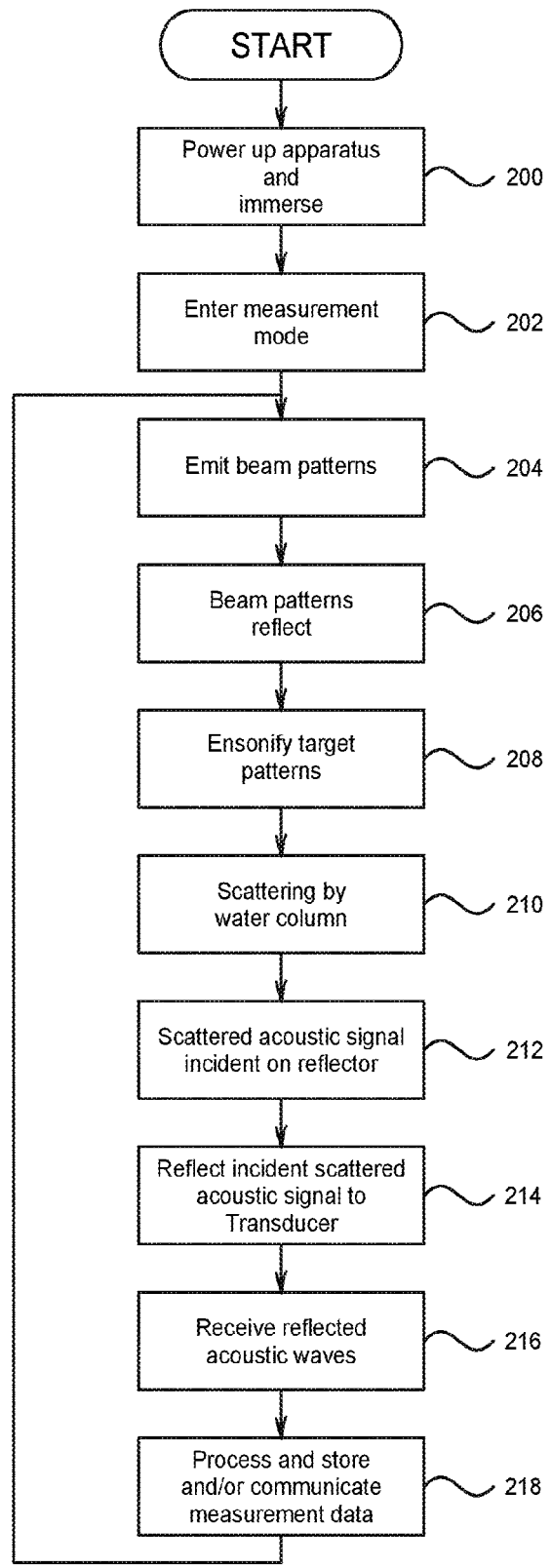
FIG. 6 is a flow diagram of a method ensonifying a target portion of a water column constituting another embodiment of the invention.

In operation (FIG. 6), the apparatus 100, which can be in a sleep mode, is powered up and immersed (Step 200) in a water column. The apparatus 100 is then woken up, for example using an acoustic command communicated to the acoustic modem 121, to place the apparatus in a measurement mode (Step 202). In response to being placed in the measurement mode, the first, second, third and fourth acoustic transducers 112, 114, 116, 118 generate (Step 204) respective first, second, third and fourth acoustic beam patterns, each having a primary lobe and secondary lobes. The radially extending portion of each of the first, second, third and fourth acoustic beam patterns respectively intersect the first, second, third and fourth acoustic mirrors 102, 104, 106, 108. In this regard, the primary lobes of the first, second, third and fourth acoustic beam patterns are respectively aimed at the first, second, third, and fourth acoustic mirrors 102, 104, 106, 108. As some of the respective secondary lobes of the acoustic beam patterns emitted by the first, second, third and fourth acoustic transducers 112, 114, 116, 118 can respectively intersect the first, second, third and fourth acoustic mirrors 102, 104, 106, 108 and result in corruption of measurements attributable to the primary lobes, the first, second, third and fourth acoustic transducers 112, 114, 116, 118 respectively are configured to under-illuminate the first, second, third and fourth acoustic mirrors 102, 104, 106, 108 so that the secondary, side, lobes do not extend beyond the peripheries of the first, second, third and fourth acoustic mirrors 102, 104, 106, 108, respectively. In this regard, it should be appreciated that the amount by which the first, second, third and fourth acoustic mirrors 102, 104, 106, 108 are under-illuminated by the first, second, third and fourth acoustic transducers 112, 114, 116, 118, respectively, is optimised by numerical simulation and can vary between implementations.

The first, second, third and fourth acoustic mirrors 102, 104, 106, 108 respectively reflect (Step 206) the first, second, third and fourth acoustic beam patterns to a first, second, third and fourth target portion of the water column, respectively. The first, second, third and fourth target portions of the water column are therefore ensonified (Step 208). As mentioned above, the configuration of the first, second, third and fourth acoustic mirrors 102, 104, 106, 108 is such that reflection of side lobes of the first, second, third and fourth acoustic beam patterns is minimised. In this regard, the primary lobes of the beam patterns constitutes respective beam portions of interest emitted by the first, second, third and fourth acoustic transducers 112, 114, 116, 118, respectively. Furthermore, the structural configuration of the apparatus 100 prevents a shadow being cast respectively on the first, second, third and fourth acoustic mirrors 102, 104, 106, 108, when the respective beam portion of interest is emitted by the first, second, third and fourth acoustic transducers 112, 114, 116, 118, as well as being respectively cast on the respective target portions of the water column to be ensonified by the respective reflections of the beam portion of interest.

Features and/or properties of the water column, for example in the first, second, third and fourth target portions of the water column, reflect or backscatter (Step 210) the acoustic waves ensonifying the first, second, third and fourth target portions of the water column to varying degrees and the reflected acoustic waves are respectively incident (Step 212) upon the first, second, third and fourth acoustic mirrors 102, 104, 106, 108, which redirect (Step 214) the reflected acoustic waves to the first, second, third and fourth acoustic transducers 112, 114, 116, 118. The first, second, third and fourth acoustic transducers 112, 114, 116, 118 each receive (Step 216) and translate the received acoustic waves to the electrical domain for further processing before storage of measurement data and/or communication via the acoustic modem 121 (Step 218) to, for example, a topside vessel (not shown). This process is repeated (Steps 204 to 218) until the apparatus 100 is no longer required to make measurements in respect of the water column and is placed in a sleep mode and/or recovered.

The skilled person should appreciate that the above-described implementations are merely examples of the various implementations that are conceivable within the scope of the appended claims. Indeed, it should be appreciated that although the above examples comprise four pairs of acoustic projectors and acoustic reflectors, this number of pairs of projectors and reflectors can be varied and it is contemplated that the apparatus 100 can comprise, in other implementations, fewer pairs of acoustic projectors and acoustic reflectors, for example three pairs of acoustic projectors and acoustic reflectors. Similarly, the apparatus 100 can have, in other implementations, five or more pairs of acoustic projectors and acoustic reflectors.

However, providing more than three pairs of acoustic projectors and acoustic reflectors, for example where each acoustic reflector is substantially equidistantly spaced from each other about the spacer 120, facilitates a level of redundancy in the event of failure of an acoustic projector.

It should be appreciated that the acoustic projectors described above are merely examples of acoustic devices. In the examples described herein, the acoustic devices both transmit and then receive acoustic signals, and so are transceivers in such examples. However, the skilled person should appreciate that in some examples the acoustic device can be configured only to transmit, for example an acoustic transmitter, or only to receive, for example an acoustic receiver. In other examples, the acoustic device can be configured to receive and then transmit, as in the case of an acoustic transponder. In some examples, one or more of the acoustic devices can be configured to transmit acoustic signals and one or more of the acoustic devices can be configured to receive acoustic signals. Indeed, in other examples, the acoustic devices can comprise a mixture of two or more of: transmitters, receivers, transceivers and transponders.

Although in the above examples, the acoustic projectors have been assumed to project downwardly towards the acoustic reflectors, it should be appreciated that such a relative location of projectors and reflectors is relative to an orientation of the apparatus. Furthermore, in the orientation described herein, the locations of the acoustic projectors and acoustic reflectors can be swapped, either for all of the acoustic projectors and acoustic reflectors or simply some pairs of acoustic projectors and acoustic reflectors. In this regard, the above possible alternative envisages the possibility of a fewer or greater number of acoustic reflectors.

The above examples employ parabolic reflectors, which are child reflectors derived from larger parent paraboloids. However, in another example, one or more of the acoustic reflectors can be of a different shape, for example one or more of the acoustic reflectors can be derived from a parabolic trough shape.

In other embodiments, the apparatus 100 can comprise fewer acoustic reflectors than acoustic projectors and two or more acoustic projectors can share, for example be aimed at, the same acoustic reflector, such as two acoustic projectors sharing the same acoustic reflector.

The invention claimed is:

1. An underwater acoustic receiver apparatus comprising:
a central spacer having a central longitudinal axis, the central spacer having a first end longitudinally distal from a second end thereof with respect to the central longitudinal axis;
a first acoustic device operably coupled at the first end of the central spacer and aimed at a first acoustic reflector operably coupled to the second end of the central spacer, the first acoustic device being spaced from the first acoustic reflector by a first predetermined distance;
a second acoustic device operably coupled at the first end of the central spacer and aimed at a second acoustic reflector operably coupled to the second end of the central spacer, the second acoustic device being spaced from the second acoustic reflector by a second predetermined distance; and
a third acoustic device operably coupled at the first end of the central spacer and aimed at a third acoustic reflector operably coupled to the second end of the central spacer, the third acoustic device being spaced from the third acoustic reflector by a third predetermined distance, wherein
the first acoustic device, the second acoustic device, and the third acoustic device are disposed about the central longitudinal axis of the central spacer at the first end thereof, the first acoustic reflector, the second acoustic reflector, and the third acoustic reflector are disposed about the central longitudinal axis of the central spacer at the second end thereof, and
the first acoustic reflector, the second acoustic reflector, and the third acoustic reflector are oriented away from each other and from the central spacer.

2. The apparatus according to claim 1, wherein the first acoustic reflector, the second acoustic reflector and the third acoustic reflector are respectively oriented away from the central longitudinal axis.

3. The apparatus according to claim 2, wherein
the first acoustic reflector, the second acoustic reflector and the third acoustic reflector are each laterally offset relative to the first acoustic device, the second acoustic device and the third acoustic device, respectively, and the central longitudinal axis.

4. The apparatus according to claim 1, wherein each of the first acoustic reflector, the second acoustic reflector and the third acoustic reflector is a parabolic reflector.

5. The apparatus according to claim 4, wherein each of the parabolic reflectors define a section of a paraboloid, the first acoustic device, the second acoustic device and the third acoustic device being aimed at the respective section of the paraboloid.

6. The apparatus according to claim 5, wherein a secondary axis of symmetry of the section of the paraboloid is off-axis relative to a primary axis of symmetry of the first acoustic reflector, the second acoustic reflector and the third acoustic reflector.

7. The apparatus according to claim 1, further comprising:
lines of sight respectively from the each of the first acoustic device, the second acoustic device and the third acoustic device to an internal surface of the each of the first acoustic reflector, the second acoustic reflector and the third acoustic reflector; wherein
the lines of sight are unimpeded.

8. The apparatus according to claim 1, wherein the each of the first acoustic reflector, the second acoustic reflector and the third acoustic reflector is configured to extend laterally and respectively beyond the each of the first acoustic device, the second acoustic device and the third acoustic device.

9. The apparatus according to claim 1, further comprising:
a deployed orientation; and
a first end and a second end relative to the deployed orientation; wherein
the first acoustic device, the second acoustic device and the third acoustic device are disposed towards the first end; and
the first acoustic device, the second acoustic device and the third acoustic device are oriented downwardly towards the second end.

10. The apparatus according to claim 1, further comprising:
a fourth acoustic device.

11. The apparatus according to claim 10, wherein the fourth acoustic device is aimed at the first acoustic reflector, the fourth acoustic device being disposed at another predetermined distance from the first acoustic reflector.

12. The apparatus according to claim 1, further comprising:
a fourth acoustic reflector; wherein
a fourth acoustic device is aimed at the fourth acoustic reflector, the fourth acoustic device being disposed at another predetermined distance from the fourth acoustic reflector.

13. The apparatus according to claim 1, wherein each of the first acoustic device, the second acoustic device, and the third acoustic device is an acoustic projector.

14. The apparatus according to claim 13, wherein the first acoustic projector, the second acoustic projector and the third acoustic projector are each configured to generate an acoustic beam pattern having a primary lobe and the first acoustic reflector, the second acoustic reflector and the third acoustic reflector are respectively located relative to the first acoustic projector, the second acoustic projector and the third acoustic projector so as to intersect the primary lobe of the first acoustic projector, the second acoustic projector and the third acoustic projector, respectively.

15. The apparatus according to claim 14, wherein the first acoustic reflector, the second acoustic reflector and the third acoustic reflector respectively define an f-number associated therewith, the f-number being set so as to minimize reflection of side lobes of the acoustic beam pattern of the first acoustic projector, the second acoustic projector and the third acoustic projector, respectively.

16. The apparatus according to claim 13, wherein the first acoustic projector, the second acoustic projector and the third acoustic projector are each an acoustic transducer.

17. The apparatus according to claim 16, wherein the acoustic transducers are single crystal ceramic transducers.

18. An Acoustic Doppler Current Profiler apparatus comprising the apparatus according to claim 1.

19. A method of receiving acoustic reflections from a target portion of a water column, the method comprising:
  providing a central spacer having a central longitudinal axis, the central spacer having a first end longitudinally distal from a second end thereof with respect to the central longitudinal axis;
  disposing a first acoustic device, a second acoustic device and a third acoustic device about the central longitudinal axis of the central spacer at the first end thereof;
  disposing a first acoustic reflector, a second acoustic reflector and a third acoustic reflector about the central longitudinal axis of the central spacer at the second end thereof;
  spacing the first acoustic device a first predetermined distance from the first acoustic reflector and aiming the first acoustic device at the first acoustic reflector;
  spacing the second acoustic device a second predetermined distance from the second acoustic reflector and aiming the second acoustic device at the second acoustic reflector;
  spacing the third acoustic device a third predetermined distance from the third acoustic reflector and aiming the third acoustic device at the third acoustic reflector;
  orienting the first acoustic reflector, the second acoustic reflector and the third acoustic reflector away from each other and the central spacer;
  the first acoustic device receiving a first acoustic beam from the first acoustic reflector, the first acoustic reflector reflecting the first acoustic beam from the target portion of the water column;
  the second acoustic device receiving a second acoustic beam from the second acoustic reflector, the second acoustic reflector reflecting the second acoustic beam from the target portion of the water column; and
  the third acoustic device receiving a third acoustic beam from the third acoustic reflector, the third acoustic reflector reflecting the third acoustic beam from the target portion of the water column.

* * * * *